US008939211B2

(12) United States Patent
McGuire et al.

(10) Patent No.: US 8,939,211 B2
(45) Date of Patent: Jan. 27, 2015

(54) HYDROCARBON RECOVERY PROCESS

(75) Inventors: Patrick Lee McGuire, Eagle River, AK (US); Euthimios Vittoratos, Anchorage, AK (US)

(73) Assignee: BP Corporation North America Inc., Warrenville, IL (US)

( * ) Notice: Subject to any disclaimer, the term of this patent is extended or adjusted under 35 U.S.C. 154(b) by 632 days.

(21) Appl. No.: 13/138,116

(22) PCT Filed: Dec. 23, 2009

(86) PCT No.: PCT/US2009/069404
§ 371 (c)(1),
(2), (4) Date: Jul. 8, 2011

(87) PCT Pub. No.: WO2010/080657
PCT Pub. Date: Jul. 15, 2010

(65) Prior Publication Data
US 2011/0278002 A1 Nov. 17, 2011

Related U.S. Application Data

(60) Provisional application No. 61/193,925, filed on Jan. 8, 2009.

(51) Int. Cl.
*E21B 43/16* (2006.01)
*C09K 8/58* (2006.01)

(52) U.S. Cl.
CPC ............... *C09K 8/58* (2013.01); *Y10S 507/937* (2013.01)
USPC ............ 166/300; 166/268; 166/275; 507/937

(58) Field of Classification Search
None
See application file for complete search history.

(56) References Cited

U.S. PATENT DOCUMENTS 3,066,732 A * 12/1962 McEver .................. 166/266
3,111,984 A * 11/1963 Reisberg .................. 166/270.1
3,158,199 A * 11/1964 Parkhurst .................. 166/305.1

(Continued)

FOREIGN PATENT DOCUMENTS

WO  WO2006/002192 A2  1/2006
WO  WO 2008/029124     3/2008

OTHER PUBLICATIONS

International Search Report for PCT/US2009/069404, mailed Mar. 31, 2010.

(Continued)

*Primary Examiner* — Angela M DiTrani
*Assistant Examiner* — Anuradha Ahuja
(74) *Attorney, Agent, or Firm* — Nixon & Vanderhye P.C.

(57) ABSTRACT

Method for increasing recovery of crude oil from a reservoir having an oil-bearing porous subterranean formation with a permeability of greater than 10 millidarcies, the formation including rock having pores with crude oil and connate water having a multivalent cation content present within the pores. The crude oil in the formation has an API gravity of less than 30°, a viscosity greater than 1 centipoise, and undissolved solids suspended therein. Injection water having undissolved solids suspended therein, a total dissolved solids content of 30,000 ppm or less and a multivalent cation content such that a ratio of the multivalent cation content of the injection water to the multivalent cation content of the connate water is less than 0.9, is injected into the formation, to produce an emulsion within the formation. The emulsion has an undissolved suspended solids content of at least 0.05% by weight of emulsion.

18 Claims, 5 Drawing Sheets

(56) References Cited

U.S. PATENT DOCUMENTS

| | | | | |
|---|---|---|---|---|
| 3,258,071 | A | * | 6/1966 | Chung et al. ............... 166/275 |
| 3,376,925 | A | * | 4/1968 | Coppel ...................... 166/400 |
| 3,380,531 | A | * | 4/1968 | McAuliffe et al. .......... 166/371 |
| 3,454,095 | A | * | 7/1969 | Webster et al. ............. 166/303 |
| 3,464,492 | A | * | 9/1969 | Friedman ................. 166/270.1 |
| 3,537,520 | A | * | 11/1970 | Holm ........................ 166/400 |
| 3,927,716 | A | * | 12/1975 | Burdyn et al. ........... 166/270.1 |
| 4,359,093 | A | * | 11/1982 | Bernard ..................... 166/400 |
| 4,463,809 | A | * | 8/1984 | Tao ............................ 166/303 |
| 4,504,399 | A | * | 3/1985 | Stapp ......................... 507/260 |
| 4,618,348 | A | * | 10/1986 | Hayes et al. ................. 44/301 |
| 4,666,457 | A | * | 5/1987 | Hayes et al. ................. 44/281 |
| 4,706,749 | A | * | 11/1987 | Hayes et al. ................ 166/267 |
| 4,757,833 | A | * | 7/1988 | Danley ......................... 137/13 |
| 4,929,341 | A | * | 5/1990 | Thirumalachar et al. ... 208/390 |
| 4,951,921 | A | * | 8/1990 | Stahl et al. .................. 166/270 |
| 5,056,596 | A | * | 10/1991 | McKay et al. .............. 166/402 |
| 5,080,809 | A | * | 1/1992 | Stahl et al. .................. 507/221 |
| 5,855,243 | A | * | 1/1999 | Bragg ......................... 166/275 |
| 5,910,467 | A | * | 6/1999 | Bragg ......................... 507/202 |
| 2006/0054538 | A1 | * | 3/2006 | Hsu et al. .................... 208/263 |
| 2006/0185845 | A1 | * | 8/2006 | Shpakoff et al. ......... 166/270.1 |
| 2006/0260980 | A1 | * | 11/2006 | Yeung ........................... 208/39 |
| 2011/0030967 | A1 | * | 2/2011 | McGuire ..................... 166/369 |

OTHER PUBLICATIONS

McGuire, P.L. et al., "Low Salinity Oil Recovery: An Exciting New EOR Opportunity for Alaska's North Slope", SPE Western Regional Meeting, No. 93903, (Mar. 30, 2005), pp. 1-15.

Kosutic, K., et al; "Removal of sulfates and other inorganics from potable water by nanofiltration membranes of characterized porosity"; *Separation and Purification Technology*, vol. 37, pp. 177-185 (2004).

\* cited by examiner

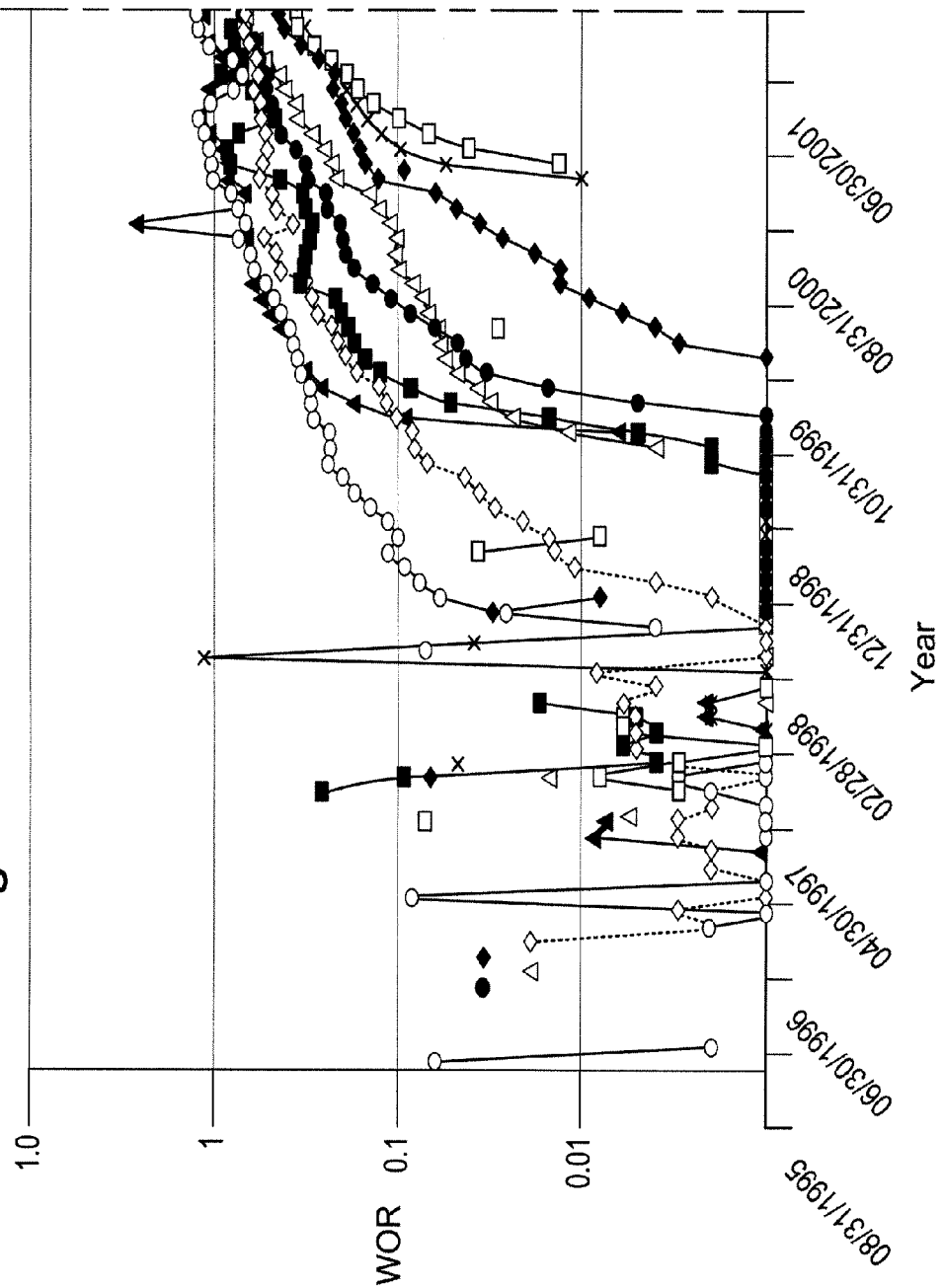

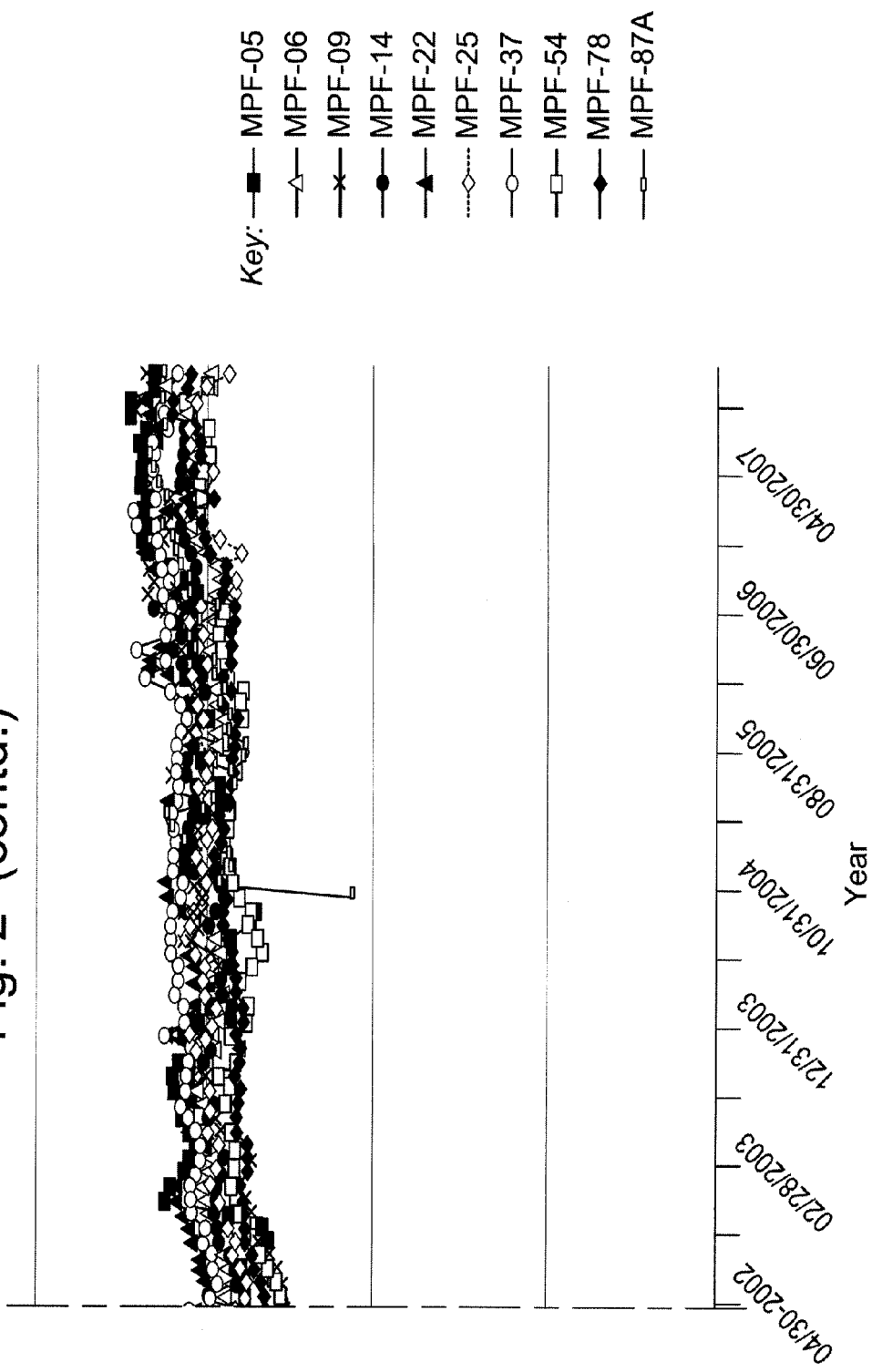
Fig. 2 (contd.)

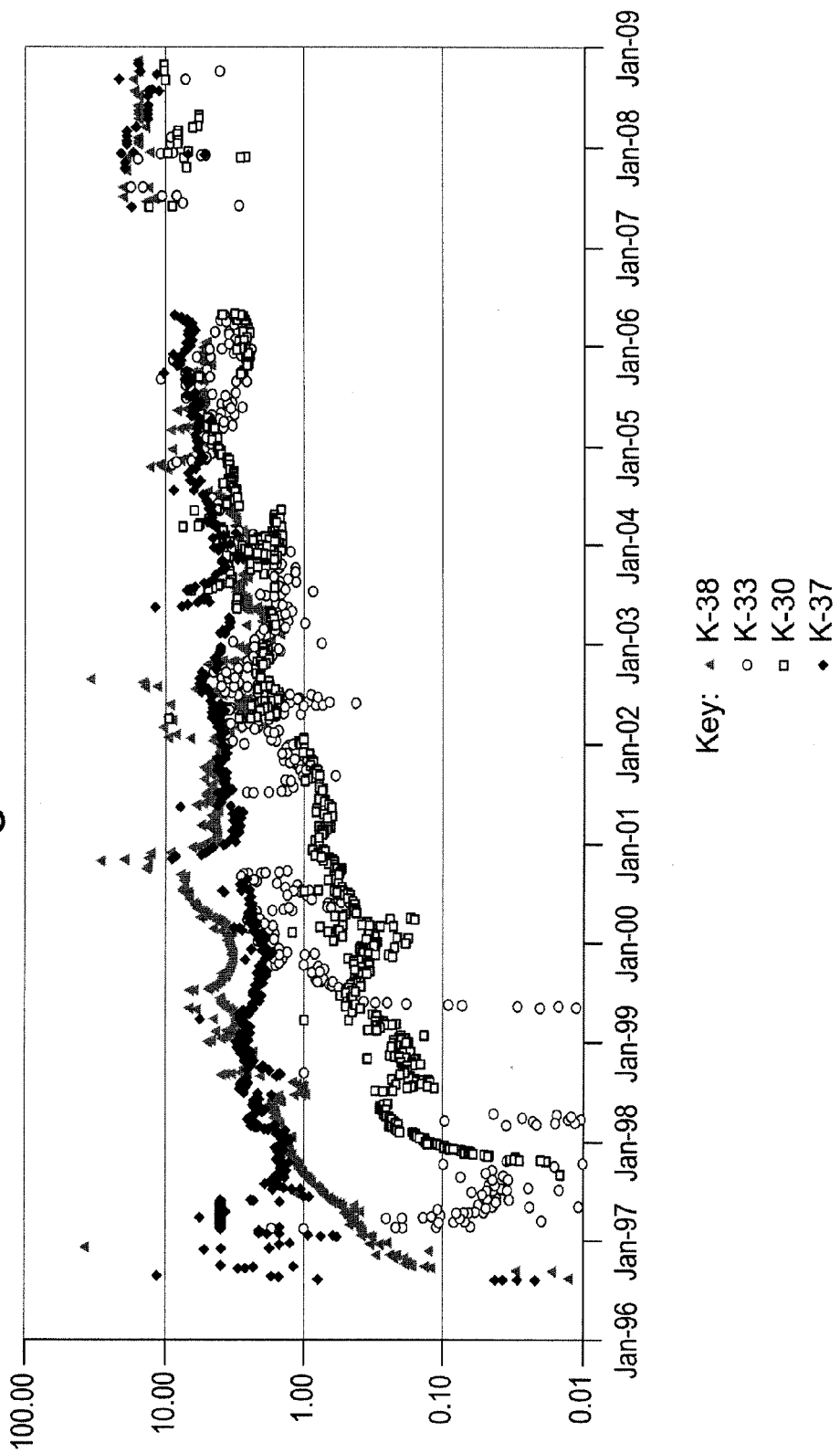

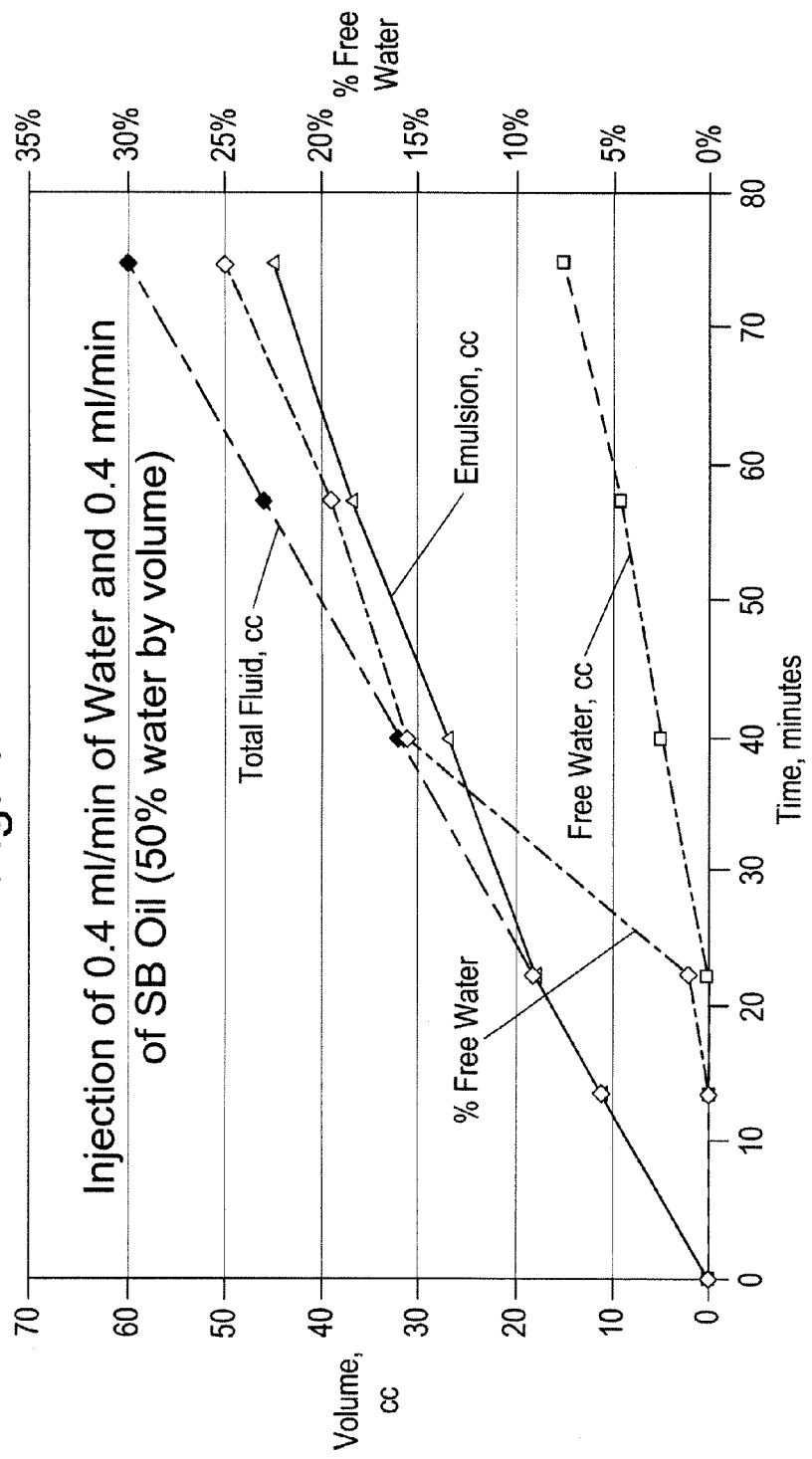

HYDROCARBON RECOVERY PROCESS

This application is the U.S. national phase of International Application No. PCT/US2009/069404, filed 23 Dec. 2009, which designated the U.S., and claims the benefit of U.S. Provisional Application No. 61/193,925, filed 8 Jan. 2009, the entire contents of each of which are hereby incorporated by reference.

The present invention relates to a process for recovering hydrocarbons from a porous and permeable subterranean hydrocarbon-bearing formation by injecting a water having certain selected characteristics into the formation such that a water-in-oil emulsion is formed within the formation.

BACKGROUND OF THE INVENTION

It has long been known that only a portion of the oil can be recovered from an oil-bearing subterranean formation as a result of the natural energy of the reservoir. So-called secondary recovery techniques are used to force more oil out of the reservoir, the simplest method of which is by direct replacement with another medium, usually water or gas.

Water-flooding is one of the most successful and extensively used secondary recovery methods. Water is injected, under pressure, into reservoir rocks via injection wells, driving the oil through the rock towards production wells. The water used in water-flooding is generally saline water from a natural source such as seawater.

According to U.S. Pat. No. 5,855,243, oil recovery is usually inefficient in subterranean formations where the mobility of the in situ oil being recovered is significantly less than that of the drive fluid used to displace the oil. Mobility of a fluid phase in a formation is defined by the ratio of the fluid's relative permeability to its viscosity. For example, when waterflooding is applied to displace very viscous heavy oil from a formation, the process is very inefficient because the oil mobility is much less than the water mobility. The water quickly channels though the formation to the producing well, bypassing most of the oil and leaving it unrecovered. It is said that water-in-oil macroemulsions have been proposed as a method for producing viscous drive fluids that can maintain effective mobility control while displacing moderately viscous oils. For example, the use of water-in-oil and oil-in-water macroemulsions have been evaluated as drive fluid to improve oil recovery of viscous oils. Such emulsions have been created by addition of sodium hydroxide to acidic crude oil from Canada and Venezuela. In this study, the emulsions were stabilized by soap films created by saponification of acidic hydrocarbon components in the crude oil by sodium hydroxide These soap films reduced the oil/water interfacial tension, acting as surfactants to stabilize the water-in-oil emulsion. It is well known, therefore that the stability of such emulsions substantially depends on the use of sodium hydroxide (i.e., caustic) for producing a soap film to reduce the oil/water interfacial tension.

U.S. Pat. No. 5,855,243 teaches that practical applications of the use of caustic for producing emulsions has been limited by the high costs of the caustic, likely adsorption of the soap films onto the formation rock leading to gradual breakdown of the emulsion, and the sensitivity of the emulsion viscosity to minor changes in water salinity and water content. For example because most formations contain water with many dissolved solids, emulsions requiring fresh or distilled water often fail to achieve design potential because such low-salinity conditions are difficult to achieve and maintain within the actual formation. Ionic species can be dissolved from the rock and the injected fresh water can mix with the high-salinity resident water, causing breakdown of the low-tension stabilized emulsion.

According to the invention of U.S. Pat. No. 5,855,243, there is provided a method for producing a fluid having hydrocarbons from a subterranean formation having hydrocarbons and formation solids, comprising:

(a) making a solids-stabilized emulsion having water, oil and undissolved solids, said solids comprising particles selected from the group consisting of formation solid particles, non-formation solid particles, and combinations thereof;

(b) contacting the formation with said emulsion; and (c) producing said fluid from the formation using said emulsion.

U.S. Pat. No. 5,855,243 is primarily focused on injecting a pre-formed solids stabilized emulsion into a subterranean formation. However, a problem with injecting a pre-formed emulsion into a formation is that the emulsion will have low injectivity compared with an injection water owing to the emulsion having a higher viscosity than water, and the emulsion containing droplets that cause formation face blockage. In addition, filtration of the emulsion droplets reduces the permeability of the near-wellbore region of the injection well. In order to maintain the same injection rate for an emulsion as for water, a higher injection pressure will be required which may not be possible because of pump constraints or formation fracturing concerns. Alternative solutions to the lower injectivity of emulsions include providing more injection wells or deliberately fracturing the injection wells to improve injectivity. However, additional injection wells result in increased capital expenditure while deliberately fracturing the injection wells increases costs and raises the issue of fracture control.

Although U.S. Pat. No. 5,855,243 also teaches that solids-stabilized emulsions can be generated "in situ" by injecting the requisite solid particles dispersed in water into a formation having hydrocarbons which can be used for making the emulsion in situ, no examples of oil recovery using emulsions formed in situ are provided. Instead, the examples are concerned with injecting pre-formed emulsions into a core.

U.S. Pat. No. 5,855,243 teaches that the water used for making the solids-stabilized emulsion should have sufficient ion concentration to keep the emulsion stable under formation conditions. Preferably, formation water (water produced from the formation) is used to make the emulsion. Fresh water could be used provided that the ion concentration is adjusted as needed for stabilizing the emulsion under formation conditions. Contrary to the teachings of U.S. Pat. No. 5,855,243, it has now been found that a stable water-in-oil emulsion may be formed in situ when: (a) the oil that is contained in the formation has an American Petroleum Institute (API) gravity of less than 30° and a viscosity under reservoir conditions of greater than 1 centipoise; (b) both the injected water and the oil that is present in the pores of the formation have undissolved solids suspended therein; and (c) the ratio of the total multivalent cation content of the injection water to the total multivalent cation content of the connate water is less than 0.9, preferably, less than 0.8.

SUMMARY OF THE INVENTION

Thus, the present invention provides a method for increasing the recovery of crude oil from a reservoir comprising at least one oil-bearing porous subterranean formation having a permeability of greater than 10 millidarcies wherein (a) crude oil and connate water are present within the pore space of the formation rock, and (b) the crude oil that is present in the formation has an American Petroleum Institute (API) gravity of less than 30°, a viscosity under reservoir conditions of greater than 1 centipoise, and undissolved solids suspended therein, the method comprising:

(A) injecting an injection water into the formation wherein the injection water has undissolved solids suspended therein, a total dissolved solids content (TDS) of 30,000 ppm or less, and a ratio of the total multivalent cation content of the injection water to the total multivalent cation content of the connate water of less than 0.9; and (B) producing within the hydrocarbon-bearing formation an emulsion comprising a discontinuous aqueous phase and a continuous oil phase (hereinafter "water-in-oil" emulsion) wherein the total amount of undissolved solids suspended in the injection water and of undissolved solids suspended in the crude oil is sufficient for the emulsion to have an undissolved suspended solids content of at least 0.05% by weight (0.5 kg/m$^3$) of emulsion.

The suspended solids content of the emulsion that is produced within the hydrocarbon-bearing formation may be determining by taking a core from the formation and conditioning the core such that it is saturated with connate water. Alternatively, a sandpack may be conditioned such that it is saturated with connate water. A mixture of produced crude oil (containing its suspended solids) and the desired injection water (containing its suspended solids) is then injected through the core in a ratio of, for example, 1:1 by volume thereby forming a water-in-oil emulsion within the core. The fluids produced from the core or sandpack comprise a water-in-oil emulsion phase and optionally a free water and/or free oil phase. The emulsion phase is allowed to separate and the suspended solids content of the separated oil and water phases is determined together with the % volume of the separated phases thereby allowing the suspended solids content of the emulsion phase to be determined. If necessary, an emulsion breaker (demulsifier) is used to break the emulsion phase.

It is also envisaged that the emulsion that is produced from the formation via a production well may be sampled and the suspended solids content of the emulsion is determined as described above. If necessary, an emulsion breaker (demulsifier) is used to break the emulsion that is produced from the production well.

Preferably, the injection water contains substantially no added alkali and/or surfactant. By the injection water containing substantially no added alkali is meant that the injection water contains less than 0.1% by weight of added alkali (such as sodium hydroxide, sodium carbonate, sodium bicarbonate, sodium silicate or sodium phosphate), preferably, no added alkali. By the injection water containing substantially no added surfactant is meant that the injection water contains less than 0.01% by weight of added surfactant, preferably, no added surfactant.

The term "water-in-oil" emulsion refers to an emulsion comprising a discontinuous aqueous phase and a continuous oil phase.

The term "multivalent cation ratio" is defined as the ratio of the total multivalent cation content (ppm) of the injection water to the multivalent cation content of the connate water (ppm).

The term "divalent cation ratio" is defined as the ratio of the total divalent cation content (ppm) of the injection water to the divalent cation content of the connate water (ppm).

The term "connate water" refers to the original water that was trapped in the pore space of the formation rock (prior to any injection of water into the formation during recovery of oil from the formation).

It has been found that the total dissolved solids content of the injection water is not a critical factor for the spontaneous formation of a water-in-oil emulsion within the formation, provided that the TDS of the injection water is 30,000 ppm or less and the multivalent cation ratio is less than 0.9. For example, an emulsion may form spontaneously within the formation when the injection water has a TDS in the range of 20,000 to 30,000 ppm provided that the multivalent cation ratio is less than 0.9. However, oil recovery has been found to increase with decreasing TDS of the injection water.

Accordingly, the total dissolved solids content (TDS) of the injection water is preferably, less than 25,000 ppm, more preferably, less than 20,000 ppm, still more preferably, less than 15,000 ppm, in particular, less than 10,000 ppm, for example, less than 8,000 ppm. It is preferred that the injection water is a low salinity water having a total dissolved solids content in the range of 200 to 10,000 ppm, preferably, 500 to 8,000 ppm, in particular, 1,000 to 5,000 ppm.

Preferably, undissolved solids are suspended in the injection water in an amount of at least 0.05 kg/m$^3$, in particular, at least 0.1 kg/m$^3$. These undissolved solids are generally naturally occurring and may be within the water prior to injection into the formation and/or may be formation fines that are mobilized by the injection water. Typically, the undissolved solids that are suspended in the injection water have an average particle size of 10 microns or less, preferably, 2 microns or less, more preferably, 1 micron or less, most preferably, 100 nm or less. The average particle size measurement is the largest of each of three measurements taken along the x, y, and z axis of each particle with the average being determined using either a weight or number distribution of such particles in a representative sample of such naturally occurring solids. In order to allow the suspended particles to enter and percolate through the formation with the injection water, the formation rock is of relatively high permeability. Accordingly, the formation has a permeability of greater than 10 millidarcies (mD), preferably, at least 50 mD, for example, at least 100 mD. The pore throat size of the formation should also be sufficiently high to allow the suspended particles to pass through the pore throats. Preferably, the formation has an average pore throat size of at least 10 microns, preferably, at least 20 microns, for example, at least 40 microns, thereby allowing the solids that are suspended in the injection water and in the emulsion that is formed within the formation to migrate through the formation. However, the type of formation rock is not critical. Thus, the formation may comprise a sandstone or a carbonate rock.

Typically, the formation is penetrated by at least one injection well and by at least one production well spaced from said at least one injection well. Accordingly, the injection water is injected into the formation via the injection well(s) and the water-in-oil emulsion is recovered from the production well(s). However, it is also envisaged that the present invention may be applied to a "huff and puff" process where a production well is put through a cycle of injecting the injection water from the well into the formation, leaving the well to soak and then producing a water-in-oil emulsion from the well.

Preferably, the crude oil that is contained in the pores of the formation has at least 0.05% by weight (0.5 kg/m$^3$), preferably, at least 0.1% by weight (1 kg/m$^3$) of undissolved solids suspended therein. The solids that are suspended in the crude oil are indigenous to the formation. Typically, the average particle size of the solids that are suspended in the crude oil is 10 microns or less, preferably, 2 microns or less, more preferably, 1 micron or less, and most preferably 100 nm or less. The solids that are suspended in the crude oil may be comprised of aluminosilicate clays, calcite, silica, barite, plagioclase feldspars, and iron rich minerals (for example, iron oxide and siderite) or may be components of the crude oil such as asphaltenes, resins, paraffins and waxes. Typically, the aluminosilicate clays, asphaltenes, resins, paraffins and waxes that are suspended in the crude oil are colloidal in size (0.001 to 1 microns). For example, aluminosilicate clay particles may be platelets having diameters in the range of 100 to 200 nm and a thickness of approximately 10 nm.

Preferably, the emulsion that is produced from the production well has a suspended solids content of at least 0.05% by weight (0.5 kg/m$^3$) of emulsion, preferably, at least 0.1% by weight (1 kg/m$^3$) of emulsion. The undissolved solids that are suspended in the produced emulsion arise from the injection water, from the crude oil and from solids contained within the formation that are capable of being mobilized by the injected water. Accordingly, the average particle size of the solids that are suspended in the produced emulsion is 10 microns or less, preferably 2 microns or less, more preferably, 1 micron or less, and most preferably, 100 nm or less.

It is envisaged that the undissolved solids that are suspended in the injection water, crude oil or produced emulsion may have a bimodal size distribution. Where there is a bimodal size distribution, there may be fine or colloidal solids having an average particle diameter, for example, in the range of 50 to 500 nm and coarse solids having an average particle diameter in the range of 1 to 10 microns.

The crude oil that is contained within the pores of the formation preferably has a Total Acid Number (TAN) value of at least 0.5 mg KOH/g. Total Acid Number (TAN) value is a measure of the amount of acidic organic compounds such as naphthenic acids, phenolic acids and sulphur-containing acids, in the crude oil that is separated at a production facility (i.e. the measure of the total amount of acidic organic impurities in the stock tank crude oil). Typically, the Total Acid Number (TAN) values, as measured by ASTM Method D0664, for the crude oil is in the range of 0.5 to 4 mg KOH/g.

The oil that is contained within the pores of the formation is a viscous crude oil having an American Petroleum Institute (API) gravity of less than 30°, preferably, less than 25°, for example, 15 to 25°. Generally, viscous oils contain high levels of asphaltenes, resins, paraffins, waxes, and naphthenic acids. Accordingly, such crudes generally have a TAN value of greater than 0.5 mg KOH/g, preferably, greater than 1 mg KOH/g, for example, 1 to 4 mg KOH/g.

Preferably, the crude oil that is contained in the pores of the formation has an asphaltene content of at least 1% wt, in particular, in an amount in the range of 1 to 20% wt. Asphaltenes are defined operationally as the n-heptane-insoluble, toluene-soluble component of a crude oil and are composed mainly of polyaromatic carbon units with oxygen, nitrogen, and sulfur, combined with minor amounts of heavy metals, particularly vanadium and nickel. The crude oil that is contained in the pores of the formation also preferably has a resin content in the range of 5 to 30% wt.

Preferably, the oil that is contained within the pores of the formation has a viscosity under reservoir conditions of at least 1 centipoise, in particular, at least 5 centipoise, for example, in the range of 10 to 1000 centipoise.

The crude oil that is mobilised using the method of the present invention is in equilibrium with the connate water. Typically, the pKa of the crude oil that is present in the pores of the formation is in the range of 5 to 6. Accordingly, the majority of the acidic organic compounds that are contained in the crude oil that is present in the pores of the formation will be in the form of salts. The person skilled in the art will understand that the monovalent cationic salts of the acidic organic compounds, in particular, monovalent cationic salts of naphthenic acids tend to act as surfactants thereby stabilizing water-in-oil emulsions while multivalent cationic salts of the acidic organic compounds do not act as surfactants. The relative amounts of the monovalent and multivalent cationic salts of the acidic organic compounds in the crude oil will therefore be dependent upon the relative amounts of the monovalent and multivalent cations in the connate water. Without wishing to be bound by any theory, it has now been found that by using an injection water that has a reduced content of multivalent cations compared with the connate water, the equilibrium between the monovalent and multivalent cationic salts of the acidic organic compounds can be shifted such that a greater proportion of the acidic organic compounds are in their monovalent cationic form, thereby allowing a stable emulsion to be formed within the formation.

The ratio of the total multivalent cation content in the injection water to the total multivalent cation content in the connate water ("multivalent cation ratio") is less than 0.9. Generally, the lower the multivalent cation ratio the more readily and emulsion is formed within the formation. Thus, the multivalent cation ratio is preferably less than 0.8, more preferably, less than 0.6, yet more preferably, less than 0.5, and especially less than 0.4 or less than 0.25. Preferred ranges for the multivalent cation ratio are 0.01 to 0.9, 0.05 to 0.8, but especially 0.05 to 0.6 or 0.1 to 0.5. The ratio of the total divalent cation content of the injection water to the total divalent cation content of the connate water (hereinafter "divalent cation ratio") is also less than 0.9. The preferred values and ranges for the multivalent cation ratio may be applied mutatis mutandis to the divalent cation ratio.

The multivalent cations in the connate water are typically divalent cations or trivalent cations. Divalent cations that may be present in the connate water or injection water include Group II metal cations, in particular, $Ca^{2+}$ and $Mg^{2+}$ but also $Ba^{2+}$ and $Sr^{2+}$, preferably $Ca^{2+}$, and also $Cr^{2+}$ and $V^{2+}$. Trivalent cations that may be present in the connate water or injection water include, $Cr^{3+}$, $Al^{3+}$, $B^{3+}$ or $V^{3+}$.

Typically, the injection water has a calcium content of less than 100 ppm, preferably, less than 50 ppm, in particular, less than 25 ppm, for example, less than 10 ppm. The magnesium content of the injection water is typically less than 100 ppm, preferably, less than 30 ppm, in particular, less than 15 ppm. The barium content of the injection water is typically, less than 20 ppm, for example, less than 10 ppm. Thus, the calcium content may be higher than the magnesium content. Preferably, the trivalent cation content of the injection water is less than 20 ppm, for example, less than 10 ppm. Preferably, the total multivalent cation content of the injection water is less than 200 ppm, preferably less than 100, especially less than 50 ppm with the proviso that the multivalent cation ratio is less than 0.9.

The invention may be applied for enhanced recovery of oil from a formation where the connate water has a wide range of TDS levels, typically, 500 to 200,000 ppm, preferably, 2,000 to 50,000 ppm, in particular 10,000 to 50,000 ppm, especially 20,000 to 45,000 ppm. As discussed above, the connate water is the original water associated with the oil in the formation and is in equilibrium with it, especially in relation to its multivalent cation content, in particular its divalent cation (e.g. calcium) content. The calcium content of the connate water is usually at least 50 ppm, such as 50 to 2,000 ppm and especially 100 to 500 ppm. The magnesium content of the connate water is usually at least 10 ppm, such as 10 to 2,000 ppm, and especially 20 to 200 ppm. The total divalent cation content of the connate water is usually at least 100 ppm, such as 100 to 5,000 ppm, preferably, 150 to 3,000 ppm, especially 200 to 1,000 ppm. Generally, connate water contains low levels of trivalent cations, usually less than 100 ppm.

Many sources of injection water may potentially be used including fresh water, seawater, brackish water, aquifer water, connate water or produced water. Fresh water may be obtained from a river or lake and typically has a TDS content of less than 1500 ppm. Brackish water may be obtained from tidal or estuary river sources and typically, has a TDS content of from 5000 to 25,000 ppm. In addition, brackish water may be obtained from an aquifer which may be in a separate stratum from a stratum associated with the crude oil. However, not all aquifer water is brackish water. Thus, the TDS content for aquifer water may be in the range of 1000 to 300,000 ppm. Where connate water or production water (water that is separated from the oil that is produced from a production well) is used as the source of the injection water, the connate water or produced water may have a TDS content in the range of 2000 to 300,000 ppm TDS. The use of connate water or produced water as a source of the injection water is advantageous where there are restrictions on disposal of connate water or produced water. Seawater may also be considered for the source of the injection water, whether inland seas of 15,000 to 40,000 ppm such as the Caspian Sea or oceanic seas, for example, of 30,000 to 45,000 ppm TDS. If desired mixtures of waters may be used as the source of the injection water, for example, a low TDS aquifer water mixed with a higher salinity water such as produced water or seawater. Use of mixed waters is particularly important when a new production well is being started as, initially, there may be no or insufficient produced water to be used as the source for the injection water.

Where the TDS content of the source water and its multivalent cation content are already at the desired values for the injection water to be emulsified into the crude oil that is contained in the pores of the formation, the source water may be used as injection water without treatment to reduce its multivalent cation content. Examples of water that may be used as the injection water without treatment include fresh water and low salinity aquifer waters of the desired multivalent cation content and desired suspended solids content. It is important that the water is not subjected to fine filtration so that suspended solids having an average particle size of 2 microns or less are not removed from the water. However, the water may be subjected to a coarse filtration using a sieve to remove particles having an average particle size of greater than 10 microns.

Where the TDS content of the source water is already at the desired value for the injection water but the multivalent cation level is higher than desired for forming an emulsion within the formation, the source water is treated to reduce its multivalent cation level. Examples of such source waters include certain low salinity produced waters and certain low salinity aquifer waters. The treatment may be by precipitation e.g. by addition of sodium hydroxide, sodium carbonate, sodium bicarbonate, sodium phosphate or sodium silicate and separation of a precipitate comprising the multivalent cation (for example, by filtration or centrifugation) thereby producing a treated water of lower multivalent cation level for use as the injection water. The treatment of the source water may also be by nanofiltration e.g. with a multivalent cation selective membrane such as DOW FILMTEC NF series (in particular, NF40, NF40HF, NF50, NF70, NF90, and NF270 membranes), HYDRANAUTICS ESNAI series, DESAL-5 membrane (Desalination Systems, Escondido, California), SU 600 membrane (Toray, Japan), or NRT 7450 and NTR 7250 membranes (Nitto Electric, Japan). The selective removal of multivalent cations from water of low TDS content (brackish water TDS content or less) using such membranes is discussed in U.S. Pat. No. 5,858,420 and in Separation and Purification Technology, 37 (2004), "Removal of sulfates and other inorganics from potable water by nanofiltration membranes of characterized porosity", by K Kosutic, I Novak, L Sipos and B Kunst. Alternatively, the source water may be treated by being passed through a bed of a cation exchange resin, for example, a hydrogen or sodium cation exchange resin. These treatment methods (other than cation exchange with a hydrogen cation exchange resin) have the benefit of not substantially increasing the pH of the injection water compared to the untreated water. Where the water has been treated to selectively remove the multivalent cations from the water, it may be necessary to add solids to the water in order to achieve the desired suspended solid content for the injection water. This is because treatment of the source water by precipitation, nanofiltration, or by passing the water through a bed of cation exchange resin, may either result in the precipitation of the suspended solids or may require removal of any suspended solids prior to treatment of the water. Thus, previously removed suspended solids of the desired particle size (average particle size of less than 2 microns) and in the desired amount (at least 0.5 kg/m$^3$) may be added back into the treated water.

Where the source water has a higher TDS and higher multivalent cation content than desired for the injection water, the source water is treated to lower both its TDS content and its multivalent cation content to the desired values. Typically, the source water is treated to lower both its TDS and multivalent cation content to the desired values, for example, using reverse osmosis, forward osmosis or combinations thereof. Source waters that are treated in this manner include, seawater, higher salinity brackish waters, high salinity produced waters and high salinity aquifer waters. The membrane that is employed in the reverse osmosis or forward osmosis, may exclude substantially all of the dissolved solids in the source water from passing into the treated water (permeate). Suitable membranes that exclude substantially all of the dissolved solids are well known to the person skilled in the art. Accordingly, the treated water may have a TDS of as low as 200 ppm, and a divalent cation content as low as 1 to 2 ppm. Typically, the treated water will not contain any trivalent cations. If desired, salts of monovalent cations may be added to the treated water to increase its TDS content with the proviso that the TDS content does not exceed 30,000 ppm. Alternatively, the source water may be treated using a "loose" reverse osmosis membrane, as described in International Patent Application number WO 2006/002192 thereby directly forming an injection water of the desired TDS content and desired multivalent cation content. Again, previously removed suspended solids of the desired particle size (average particle size of less than 2 microns) and in the desired amount (at least 0.05% by weight (at least 0.5 kg/m$^3$)) may be added back into the treated water.

Without wishing to be bound by any theory, it is believed that the suspended solids that are contained in the produced emulsion assist in stabilizing the emulsion owing to the solids accumulating at the interface between the discontinuous aqueous phase and continuous oil phase of the emulsion. In particular, at least a portion of the asphaltene component of the crude oil are in colloidal form and therefore enhance the stability of the oil-in water emulsion that is formed within the formation owing to the colloidal asphaltenes accumulating at the interface between the discontinuous aqueous phase and the continuous oil phase of the emulsion. Also, any resin components of the crude oil will tend to accumulate at the interface between the dispersed aqueous phase and continuous oil phase of the water-in-oil emulsion thereby also enhancing the stability of the emulsion.

In the method of the invention, the injection water is preferably injected under pressure, for example, of 10,000 to 100,000 kPa (100 to 1000 bar) into at least one injection well that is spaced from a production well, and passes directly into the oil-bearing formation from the injection well. The passage of the injection water into the formation results in the spontaneous formation of emulsion phase within the formation. This emulsion phase impedes the passage of any water that is subsequently injected into the formation so at least a portion of the water by-passes the zone of the formation where the emulsion is present in the pores of the formation. Accordingly, the subsequently injected water is available for sweeping a different zone of the formation and is capable of forming a spontaneous emulsion in this different zone. Accordingly, the sweep efficiency of the injected water is improved owing to the formation of the emulsion phase within the formation.

Thus, in a preferred embodiment of the present invention there is provided a method for increasing the recovery of crude oil from a reservoir comprising at least one oil-bearing porous subterranean formation having a permeability of greater than 10 millidarcies and having at least one injection well and at least one production well penetrating the formation wherein (a) crude oil and connate water are present within the pore space of the formation rock, and (b) the crude oil that is present in the formation has an American Petroleum Institute (API) gravity of less than 30°, a viscosity under reservoir conditions of greater than 1 centipoise, and undissolved solids suspended therein in an amount of at least 0.05% by weight, the method comprising:

(A) injecting an injection water into the formation via the at least one injection well wherein the injection water has undissolved solids suspended therein in an amount of at least 0.05% by weight, a total dissolved solids content (TDS) of 30,000 ppm or less, and a ratio of the total multivalent cation content of the injection water to the total multivalent cation content of the connate water of less than 0.9; and (B) producing from the at least one production well an emulsion having undissolved solids suspended therein in an amount of at least 0.05% by weight (0.5 kg/m$^3$) of emulsion.

The suspended solids content of the crude oil that is present in the formation may be determined by measuring the suspended solids content of the produced oil that is separated at a production facility.

The method of the invention is usually used with production wells having insufficient natural pressure in the formation to produce significant amounts of oil (after primary recovery). These production wells are preferably in secondary recovery (which immediately follows primary recovery) but may also be in tertiary recovery. The method of the invention is thus of particular value with mature production wells.

The water that is present in the pore space of the formation at the start of secondary recovery is connate water. However, it is also envisaged that the method of the invention may be used during tertiary recovery, for example, after waterflooding the formation with a hard water. By "hard water" is meant a water having a multivalent cation ratio of greater than 2, preferably, greater than 4, in particular, greater than 5, for example, greater than 6. Typically, the hard water is a seawater or a produced water having a TDS of greater than 12,500 ppm, preferably greater than 20,000 ppm, for example, greater than 25,000 ppm, in particular greater than 30,000 ppm. Although, at the start of tertiary recovery, there may be one or more zones of the formation that contain the hard injection water or a mixture of the hard injection water and connate water, there may also be unswept zones of the formation that contain the original connate water. It is these unswept zones that are primarily targeted by the process of the present invention during tertiary recovery. However, without wishing to be bound by any theory, it is also believed that even where zones of the formation have been swept with a high salinity water that connate water may be trapped between residual adhering oil and the rock surfaces and/or in pores that were by-passed by the high salinity water during secondary recovery. In addition, there may be a layer of the original connate water at clay surfaces, so-called "clay bound water".

The person skilled in the art will understand that in secondary or tertiary recovery, the injection water is injected into the formation from an injection well in order to maintain the pressure in the formation and to sweep oil towards a production well. A further advantage of the process of the present invention is that, following in situ production of the water-in-oil emulsion, the injection water (drive fluid) forces the water-in-oil emulsion ahead of it, and towards the production well from which the oil is recovered in the form of a water-in-oil emulsion with little, if any, of the injection water fingering through the formation and being produced into the production well as a separate aqueous phase. Accordingly, the water that is being produced from the production well is predominantly emulsified with the crude oil such that the water cut remains substantially constant for a prolonged period of time, with the water-cut being predominantly dependent on the amount of water that is emulsified into the crude oil. Typically, the water-in-oil emulsion that is formed within the formation has a water content in the range of 30 to 50% by volume, in particular, 40 to 50% by volume. The method of the present invention therefore achieves a prolonged period of oil recovery with a relatively stable and relatively low water-cut. Without wishing to be bound by any theory, it is also believed that the production of a water-in-oil emulsion within the formation also improves recovery by replacing the residual oil that a conventional waterflood would leave behind with residual emulsion. Thus, the residual emulsion will tend to remain in the same portions of the pore spaces of the formation as the residual oil that a conventional waterflood would leave behind. However, the reservoir volume of residual water-in-oil emulsion contains less oil than the equivalent reservoir volume of residual oil left behind by a conventional waterflood. The method of the present invention therefore has two distinct improved recovery mechanisms: (1) improved sweep efficiency owing to reduced mobility of the drive fluid and (2) reduction in the amount of residual oil that is trapped in the formation.

There may be one injection well and one production well, but preferably there may be more than injection well and more than one production well. There may be many different spatial relations between the or each injection well and the or each production well. Injection wells may be located around a production well. Alternatively the injection wells may be in two or more rows between each of which are located production wells. These configurations are termed "pattern flood", and the person skilled in the art will know how to operate the injection wells to achieve maximum oil recovery during secondary or tertiary recovery.

In a further preferred embodiment of the present invention there is provided a method for increasing the recovery of crude oil from a reservoir comprising at least one porous subterranean formation having a permeability of greater than 10 millidarcies wherein (a) crude oil and connate water are present within the pores of the formation, (b) the crude oil that is present in the formation has an API gravity of less than 30°, a viscosity under reservoir conditions of greater than 1 centipoise, and particulate solids having an average particle diameter of less than 2 microns suspended therein in an amount of at least 0.01% by weight (0.1 kg/m$^3$), and (c) an injection water is injected into the formation for forming a water-in-oil emulsion with the crude oil that is contained within the pores of the formation, wherein the injection water is selected by:

(a) determining the multivalent cation content of the connate water; and
(b) selecting an injection water having (i) a total dissolved solids content of less than 30,000 ppm, (ii) a total multivalent cation content such that the ratio of the total multivalent cation content of the injection water to the total multivalent cation content of the connate water is less than 0.9, and (iii) at least 0.05% by weight (0.5 kg/m$^3$) of particulate solids having an average particle diameter of less than 2 microns suspended therein.

Where the process of the present invention is to be used during secondary or tertiary recovery, a sample of connate water may be obtained by taking a core from the formation, either before production of oil from the formation or during primary recovery, and determining the multivalent cation content of the water contained within the core. Alternatively, where there has been water break-through but the reservoir remains in primary recovery, the multivalent cation content of the water that is separated from the produced oil may be determined.

Where no suitable source water is available for use as the injection water, the TDS content and/or the total multivalent cation content of the source water may be manipulated (as described above) to give an injection water of the desired TDS content and desired total multivalent cation content and the desired suspended solids content.

BRIEF DESCRIPTION OF THE DRAWINGS

The invention is further described with reference to the accompanying drawings, in which:

FIG. 2 shows waterflooding the F-Pad wells with the Prince's Creek aquifer water produced oil at a WOR ratio of approximately 1 for a period of 4 years;

FIG. 3 shows the ratio of the barrels of water produced to the barrels of oil produced (WOR) plotted as a function of time while waterflooding selected K-Pad production wells at Milne Point, Alaska with a hard high salinity injection water;

FIG. 4 shows a graph that plots total volume of fluid produced with time, volume of emulsion produced with time, volume of free water produced with time and % volume of free water with time.

Figure 1:
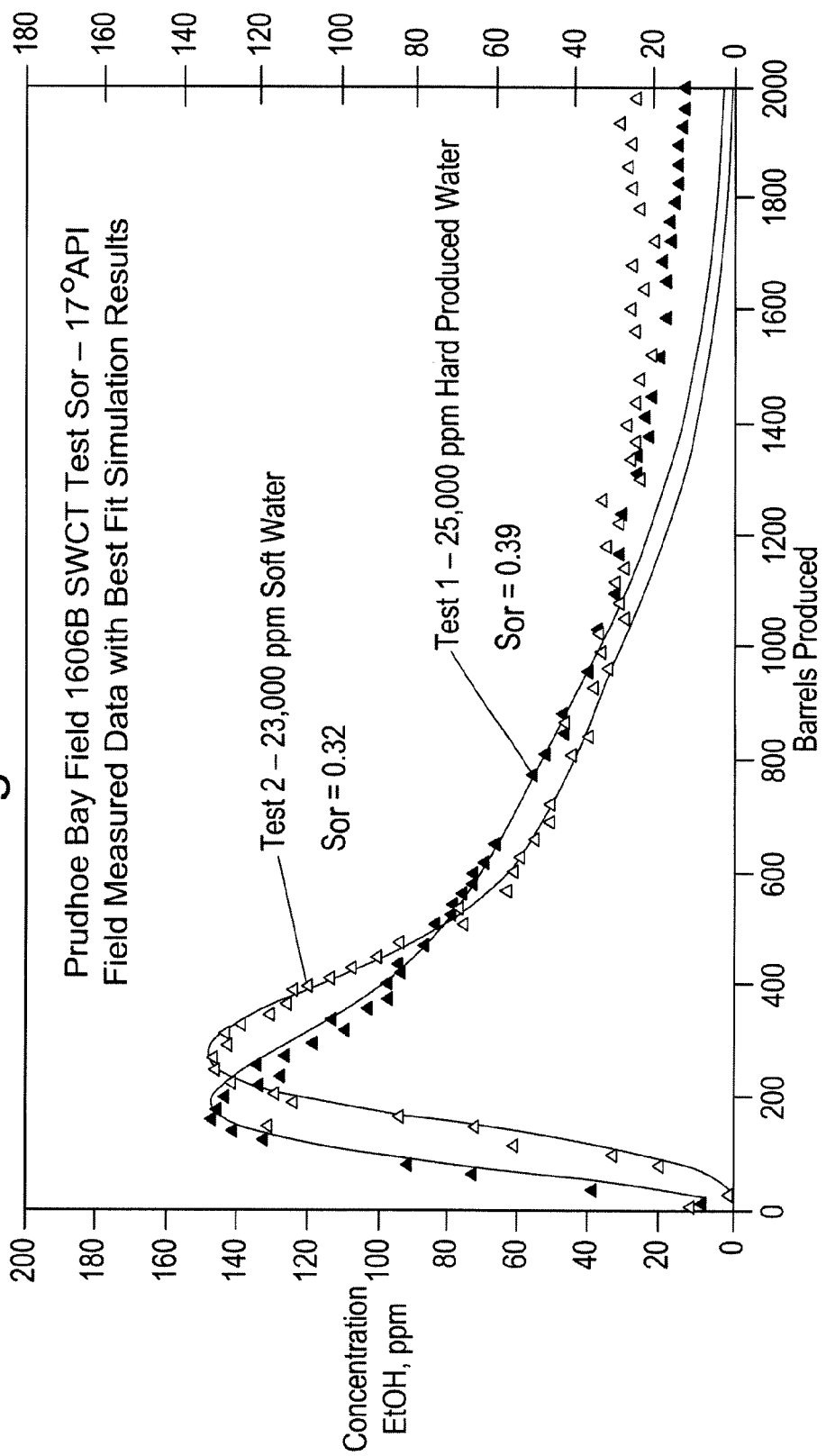
FIG. 1 shows the results Test #1 and Test #2.

The present invention will now be illustrated with respect to FIGS. 1 to 4 and the following Examples.

EXAMPLES

Single Well Chemical Tracer Test Method

A Single Well Chemical Tracer (SWCT) test is a method for measuring fluid saturations in oil producing reservoirs. The SWCT test is carried out on a watered out formation interval by injecting, and then producing back from the same well, a volume of reservoir fluid labelled with appropriate chemical tracers.

In the case of a single well residual oil ($S_{OR}$) test, as reported here, a volume of water containing a suitable ester (ethyl formate in this case) is injected into the target zone of the test well. A larger volume of water that does not contain any ester is then injected to push the ester-carrying water until it reaches a position five to fifteen feet into the reservoir (5 to 15 feet radial distance from the well bore).

The total volume injected is typically labelled with a suitable non-reactive, non-partitioning (material balance) tracer, iso-propyl alcohol (IPA).

During a shut-in period of one to ten days, a portion of the ester reacts with the reservoir water and forms ethyl alcohol (product tracer). The ethyl alcohol is virtually insoluble in the residual oil. The shut in period is designed to allow a measurable amount of ethyl alcohol to form. Typical ester to alcohol conversion is from 10% to 50%.

After the shut-in period, the well is back-produced. The produced fluid is periodically sampled at the wellhead and immediately analyzed for content of the un-reacted ethyl formate tracer, the ethyl alcohol tracer, and the material balance tracer, IPA.

At the beginning of the production step, the un-reacted ethyl formate and the product ethyl alcohol tracers are superimposed, located a radial distance of about 5 to 15 feet from the test well bore. Partitioning of the un-reacted ethyl formate tracer between the immobile residual oil phase and the mobile water phase delays production of the ester by an increment of volume directly related to the residual oil saturation. The product alcohol tracer, however, is not delayed, and flows back to the well at very nearly the same speed as the water. Since the ethyl alcohol does not spend time in the stationary oil phase, it is produced earlier than the ethyl formate tracer, resulting in a separation between the product alcohol and un-reacted ester tracers.

The amount of chromatographic separation between the two tracers is used to calculate residual oil saturation. SWCT test results from high $S_{or}$ formations show a large separation between the product alcohol and ester. Test results from low $S_{or}$ formations show a small separation between the product alcohol tracer and ester.

Example 1

Single Well Chemical Tracer (SWCT) tests were carried out in a reservoir of the Prudhoe Bay Field in Alaska that contained an oil having an API gravity of 17° and a suspended solids content of greater than 0.05% by weight. The target interval was in the Ivishak formation; the perforated interval was from 8,935 to 8,953 feet subsea depth. A first SWCT test (Test #1) was carried out using a produced water having a TDS of 25,291 ppm and a multivalent cation content of 682 ppm (hard produced water). Since the well produced 1.2% oil cut, it was necessary to inject a small volume of produced water into the test zone to reduce the oil saturation to residual before Test #1. This volume of produced water was 4,000 bbls (200 bbls/ft.). The injection rate for this water-flood of produced water was 1,900 bbls/day. To maintain clean perforations for Test #1, a small back production was performed before the injection of the hard produced water. The well was produced for 3 hours through a drillsite Test Separator and Test #1 immediately followed. An ester bank, 200 bbls of hard produced water containing 10,000 ppm Ethyl Acetate (EtAc), 2,400 ppm Normal Propyl Alcohol (NPA), and 2,200 ppm Isopropyl Alcohol (IPA), was injected first. A push bank followed, 900 bbls of hard produced water containing 2,200 ppm IPA. The injection rate was constant at 1,900 bbls/day for the entire Test #1. Based on a zone thickness of 20 feet, a residual oil saturation of 0.39, and a porosity of 0.25, the average depth of investigation for Test #1 was 13.4 feet. The well was then shut-in for 4.5 days for the reaction period, during which a fraction of the EtAc in the formation hydrolyzed to form Ethanol (EtOH). Following the reaction period, the well was placed on production for 0.5 days, for a total of 2,177 bbls of water production. Samples of the produced fluid were taken every 20 to 30 bbls and immediately analyzed for tracer content by gas chromatography on location.

A second SWCT test (Test #2) was carried out using a specifically designed injection water having a TDS of less than 23,000 pm, a suspended solids content of greater than 0.05% by weight, and a multivalent cation content of 56 ppm (soft water) following a similar procedure to Test #1. A 44% improvement in waterflood displacement efficiency was obtained by using the soft water (multivalent cation ratio of 0.08) thereby providing evidence that an emulsion was formed in situ during the second SWCTT.

The results of Test #1 and Test #2 are presented in FIG. 1. The initial water saturation (Swi) of the formation was about 55%. The residual oil saturation after flooding with hard produced water ($Sor_{hard\ produced\ water}$) in Test #1 was 39%, $\Delta So \sim 16\%$ and the residual oil saturation after flooding with soft water ($Sor_{soft\ water}$) in Test #2 was 32%, $\Delta So \sim 23\%$.

Example 2

FIG. 2 shows the ratio of the barrels of water produced to the barrels of oil produced (WOR) plotted as a function of time while waterflooding selected F-Pad production wells (MPF-05, MPF-06, MPF-09, MPF-14, MPF-22, MPF-25, MPF-37, MPF-54, MPF-78 and MPF-87A) at Milne Point, Ak. with a soft low salinity injection water. The FPad wells produce from the Kuparuk formation.

The water and oil volumes were obtained by putting each well onto 'test' for a defined period of time during which the fluid output of each well was fed to a test separator and the volume of oil and water that separated from the combined produced fluid was measured. The volumes therefore represent surface conditions (stock tank barrels).

The properties of the Milne Point oil are given in Table 1.

TABLE 1

Properties of Milne Point Oil

| API gravity, ° | TAN value, (mg KOH) | $nC_6$ Asphaltenes, wt % | Saturates wt % | Aromatics wt % | Resins wt % |
|---|---|---|---|---|---|
| 20-22 | 1.46 | 6.26 | 60.07 | 21.54 | 12.13 |

The injection water for the F-Pad production wells was a low salinity soft water (obtained from the overlying Prince Creek aquifer which is an extensive brackish water aquifer) having the composition given in Table 2.

TABLE 2

Composition of Injection Water for F-Pad production wells

| Species (ppm) | Prince Creek Aquifer Water |
|---|---|
| Sodium | 817 |
| Calcium | 101 |
| Boron | 2 |
| Potassium | 8 |
| Aluminium | <0.15 |
| Magnesium | 19 |
| Barium | 3 |
| Strontium | 2 |

TABLE 2-continued

Composition of Injection Water for F-Pad production wells

| Species (ppm) | Prince Creek Aquifer Water |
|---|---|
| Salinity (TDS) | 2600 |
| Divalent cations | 125 |

The average composition of the connate water of the Milne Point A-sands is given in Table 3.

TABLE 3

Average Composition of Connate Water for Milne Point A-Sands

| Species (ppm) | MPU 1982 A-Sand Average |
|---|---|
| Barium | 75 |
| Bicarbonate | 1,986 |
| Boron | 39 |
| Bromine | |
| Calcium | 151 |
| Chloride | 17,344 |
| Iron | 1 |
| Magnesium | 41 |
| Potassium | |
| Sodium | 11,733 |
| Strontium | 17 |
| Sulfate | 14 |
| Salinity (TDS) | 31,402 |
| Divalent cations | 285 |

FIG. 2 shows that waterflooding the F-Pad wells with the Prince's Creek aquifer water produced oil at a WOR ratio of approximately 1 for a period of 4 years. This is consistent with the production of a water-in-oil emulsion having a water content of about 50% by volume. The ratio of the divalent cation content of the Prince's Creek injection water to the divalent cation content of the connate water is 0.44 showing that the emulsion recovery mechanism was triggered by the injection of water having a divalent cation ratio of less than 0.9.

Comparative Example 1

FIG. 3 shows the ratio of the barrels of water produced to the barrels of oil produced (WOR) plotted as a function of time while waterflooding selected K-Pad production wells (K-38, K-33, K-30 and K-37) at Milne Point, Ak, with a hard high salinity injection water. The KPad production wells (like the F-Pad production wells of Example 2) produce from the Kuparuk formation.

The water and oil volumes were obtained as described for Example 2. The properties of the Milne Point oil are as given in Table 1 of Example 2.

The injection water for the K-Pad production wells was a high salinity brine from the overlying Ugnu formation which was much harder than the Kuparuk connate water. The composition of the hard, high salinity brine is given in Table 4 while the composition of the Kuparuk connate water is as given in Table 3 of Example 2.

TABLE 4

Average Composition of Ugnu Aquifer
Water for Milne Point K-Pad

| Species (ppm) | MPU 1982 A-Sand Average |
|---|---|
| Barium | 119 |
| Bicarbonate | 439 |
| Boron | 9 |
| Bromine | |
| Calcium | 951 |
| Chloride | 19,458 |
| Iron | 15 |
| Magnesium | 815 |
| Potassium | 184 |
| Sodium | 14,600 |
| Strontium | 49 |
| Sulfate | <10 |
| Salinity (TDS) | 36,639 |
| Divalent cations | 1,934 |

FIG. 3 shows no evidence of a plateau in the WOR ratio at a value of approximately 1. Instead, the K-Pad production wells exhibit a steadily increasing WOR, with the K-Pad production wells currently producing modest oil volumes at a WOR of approximately 10. In this comparative example, the ratio of the divalent cation content of the injection water to the divalent cation content of the connate water is 6.75 thereby resulting in conventional waterflood behaviour (increasing water-cut with time).

Example 3

A sand pack flood experiment was conducted in which produced water and live Alaskan light heavy oil (SB oil) were injected as separate phases into a sand pack apparatus. Key components of the sand pack apparatus included a co-axial tubular mixer, a sand packed 1 stainless steel pipe having a length of 1 ft, and a production unit.

The sand pack was packed with a sand having a permeability close that of the formation that produced the live Alaskan light heavy oil. The sand pack was initially saturated with produced oil ($S_o$=100% where $S_o$ is the oil saturation). Co-injection of the produced water and live oil into the sand pack was then conducted at a volumetric ratio of 1:1 with an oil injection rate of 0.4 ml/minute and a water injection rate of 0.4 ml/minute. Initially, the sandpack produced clean oil in the production unit. The sandpack subsequently produced a water-in-oil emulsion. This emulsion was found to slowly break over a period of about an hour. Accordingly, after an initial period of approximately 13 minutes when there was no free water, increasing volumes of free water were observed with time.

FIG. 4 shows a graph that plots the total volume of fluid produced with time, the volume of emulsion produced with time, the volume of free water produced with time and the % volume of free water with time.

The invention claimed is:

1. A method for increasing recovery of crude oil from a reservoir comprising at least one oil-bearing porous subterranean formation having a permeability of greater than 10 millidarcies, the at least one oil-bearing porous subterranean formation comprising formation rock, and the formation rock comprising pores, wherein (a) crude oil and connate water are present within the pores of the formation rock, and the connate water has a multivalent cation content, and (b) the crude oil that is present in the formation has an American Petroleum Institute (API) gravity of less than 30°, a viscosity under reservoir conditions of greater than 1 centipoise, and an amount of undissolved solids suspended therein, the method comprising:

(A) injecting an injection water into the formation wherein the injection water has an amount of undissolved solids suspended therein, a total dissolved solids content (TDS) of 30,000 ppm or less and a multivalent cation content such that a ratio of the multivalent cation content of the injection water to the multivalent cation content of the connate water is less than 0.9; and (B) producing within the oil-bearing porous subterranean formation an emulsion comprising a discontinuous aqueous phase and a continuous oil phase wherein the amount of undissolved solids suspended in the injection water and the amount of undissolved solids suspended in the crude oil is sufficient for the emulsion to have an undissolved suspended solids content of at least 0.05% by weight (0.5 kg/m$^3$) of emulsion.

2. A method as claimed in claim 1 wherein the injection water contains less than 0.1% by weight of added alkali and less than 0.01% by weight of added surfactant.

3. A method as claimed in claim 1 wherein the total dissolved solids content (TDS) of the injection water is in the range of 200 to 10,000 ppm.

4. A method as claimed in claim 3 wherein the total dissolved solids content of the injection water is in the range of 500 to 8,000 ppm.

5. A method as claimed in claim 3 wherein the total dissolved solids content of the injection water is in the range of 1,000 to 5,000 ppm.

6. A method as claimed in claim 1 wherein undissolved solids are suspended in the injection water in an amount of at least 0.05 kg/m$^3$ and the undissolved solids suspended in the injection water have an average particle size of 10 microns or less.

7. A method as claimed in claim 6 wherein the undissolved solids suspended in the injection water have an average particle size of 2 microns or less.

8. A method as claimed in claim 1 wherein the formation has an average pore throat size of at least 10 microns.

9. A method as claimed in claim 8 wherein the formation has an average pore throat size of at least 20 microns.

10. A method as claimed in claim 1 wherein the crude oil that is contained in the pores of the formation rock has at least 0.05% by weight (0.5 kg/m$^3$) of undissolved solids suspended therein and wherein the undissolved solids suspended in the crude oil have an average particle size of 10 microns or less.

11. A method as claimed in claim 10 wherein the undissolved solids suspended in the crude oil have an average particle size of 2 microns or less.

12. A method as claimed in claim 1 wherein the crude oil that is contained within the pores of the formation rock has a Total Acid Number (TAN) value in the range of 0.5 to 4 mg KOH/g.

13. A method as claimed in claim 1 wherein the crude oil that is contained in the pores of the formation rock has an asphaltene content of at least 1% weight and a resin content in the range of 5 to 30% weight.

14. A method as claimed in claim 1 wherein the oil that is contained within the pores of the formation rock has a viscosity under reservoir conditions in the range of 10 to 1000 centipoise.

15. A method as claimed in claim 1 wherein the ratio of the multivalent cation content of the injection water to the multivalent cation content of the connate water is less than 0.6.

16. A method as claimed in claim 15 wherein the ratio of the multivalent cation content of the injection water to the multivalent cation content of the connate water is less than 0.5.

17. A method for increasing recovery of crude oil from a reservoir comprising at least one oil-bearing porous subterranean formation having a permeability of greater than 10 millidarcies and having at least one injection well and at least one production well penetrating the formation the at least one oil-bearing porous subterranean formation comprising formation rock, and the formation rock comprising pores, wherein (a) crude oil and connate water are present within the pores of the formation rock, and the connate water has a multivalent cation content, and (b) the crude oil that is present in the formation has an American Petroleum Institute (API) gravity of less than 30°, a viscosity under reservoir conditions of greater than 1 centipoise, and undissolved solids suspended therein in an amount of at least 0.05 by weight, the method comprising:

(A) injecting an injection water into the formation via the at least one injection well wherein the injection water has undissolved solids suspended therein in an amount of at least 0.05% by weight, a total dissolved solids content (TDS) of 30,000 ppm or less, and a multivalent cation content such that a ratio of the multivalent cation content of the injection water to the multivalent cation content of the connate water is less than 0.9; and (B) producing from the at least one production well an emulsion having undissolved solids suspended therein in an amount of at least 0.05% by weight (0.5 kg/m$^3$) of emulsion.

18. A method for increasing recovery of crude oil from a reservoir comprising at least one porous subterranean formation having a permeability of greater than 10 millidarcies, the at least one porous subterranean formation comprising pores, wherein (a) crude oil and connate water are present within the pores of the formation and the connate water has a multivalent cation content, (b) the crude oil that is present in the formation has an API gravity of less than 30°, a viscosity under reservoir conditions of greater than 1 centipoise, and particulate solids having an average particle diameter of less than 2 microns suspended therein in an amount of at least 0.01% by weight (0.1 kg/m$^3$), and (c) an injection water is injected into the formation for forming a water-in-oil emulsion with the crude oil that is contained within the pores of the formation, wherein the injection water is selected by:

(A) determining the multivalent cation content of the connate water; and (B) selecting an injection water having (i) a total dissolved solids content of less than 30,000 ppm, (ii) a multivalent cation content such that the ratio of the multivalent cation content of the injection water to the multivalent cation content of the connate water is less than 0.9, and (iii) at least 0.05% by weight (0.5 kg/m$^3$) of particulate solids having an average particle diameter of less than 2 microns suspended therein.

* * * * *